UNITED STATES PATENT OFFICE.

GUST A. RIDDLE, OF PITTSBURG, PENNSYLVANIA, ASSIGNOR OF TWO-THIRDS TO J. W. FRITTS AND C. J. MATHEWSON, OF PITTSBURG, PENNSYLVANIA.

MANUFACTURE OF BRICK.

No. 817,988.     Specification of Letters Patent.     Patented April 17, 1906.

Application filed December 17, 1904. Serial No. 237,313.

*To all whom it may concern:*

Be it known that I, GUST A. RIDDLE, a citizen of the United States, residing at Pittsburg, in the county of Allegheny and State of Pennsylvania, have invented certain new and useful Improvements in the Manufacture of Brick; and I do declare the following to be a full, clear, and exact description of the invention, such as will enable others skilled in the art to which it appertains to make and use the same.

This invention relates to an improved composition of matter for use in the manufacture of brick for building purposes and of a highly refractory nature; and it consists in the ingredients hereinafter set forth.

My composition of matter consists of the following ingredients in or about the proportions stated, viz: ganister stone, (ground or pulverized,) nine gallons; silicate of soda, (liquid,) one gallon; water, one gallon; glycerin, twelve drops to each gallon of silicate of soda. These ingredients are thoroughly mingled or mixed in any suitable manner, as in a pug-mill used for working clay.

In using the above-named composition one gallon of silicate of soda, one gallon of water, seven gallons of ganister, and twelve drops of glycerin will manufacture sixteen bricks of ordinary or standard size, which are molded in proper form and dried by the aid of a gentle and uniform heat instead of burning in kilns, as is the usual manner.

The silicate of soda acts as a binder for the ganister, the glycerin preventing or retarding premature hardening of the mixture when a large quantity is mixed at one time.

Having thus described my invention, what I claim, and desire to secure by Letters Patent, is—

1. The herein-described composition of matter for the manufacture of brick, consisting of ground or pulverized ganister stone, silicate of soda, water and glycerin, in or about the proportions stated.

2. The herein-described composition of matter for the manufacture of brick, consisting of ground or pulverized ganister stone nine gallons, silicate of soda one gallon, water one gallon and glycerin twelve drops to each gallon of silicate of soda, substantially at set forth.

In testimony whereof I affix my signature in presence of two witnesses.

GUST A. RIDDLE.

Witnesses:
    S. B. LEVIS,
    E. M. BROWN.